(12) United States Patent
Schneider

(10) Patent No.: US 9,190,797 B2
(45) Date of Patent: Nov. 17, 2015

(54) GENERATION OF FREQUENCY COMBS AND SINC-SHAPED NYQUIST PULSE TRAINS WITH A LARGE BANDWIDTH AND TUNABLE REPETITION RATE

(71) Applicant: DEUTSCHE TELEKOM AG, Bonn (DE)

(72) Inventor: Thomas Schneider, Michendorf (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/620,203

(22) Filed: Feb. 12, 2015

(65) Prior Publication Data
US 2015/0236467 A1 Aug. 20, 2015

(30) Foreign Application Priority Data
Feb. 14, 2014 (EP) ..................................... 14155209

(51) Int. Cl.
*H01S 3/13* (2006.01)
*H01S 3/00* (2006.01)

(52) U.S. Cl.
CPC ............. *H01S 3/0078* (2013.01); *H01S 3/0057* (2013.01)

(58) Field of Classification Search
USPC ....................... 372/26, 28, 29.014, 29.016, 32
See application file for complete search history.

(56) References Cited

U.S. PATENT DOCUMENTS

| 8,750,717 B1* | 6/2014 | Yap et al. ...................... 398/158 |
| 2005/0271093 A1 | 12/2005 | Wang |
| 2014/0253915 A1* | 9/2014 | Ataie et al. .................... 356/300 |

OTHER PUBLICATIONS

M. A. Soto et al.: "Optical sinc-shaped Nyquist pulses of exceptional quality", nature communications, vol. 4, pp. 1-11 (2013).
S. Preussler et al.: "Tunable generation of ultra-narrow linewidth millimeter and THz-waves and their modulation at 40 Gbd", 2013 IEEE, pp. 119-122 (2013).

* cited by examiner

*Primary Examiner* — Dung Nguyen
(74) *Attorney, Agent, or Firm* — Norman B. Thot

(57) ABSTRACT

A method for generating an optical frequency comb with a defined number of frequency comb lines with an adjustable spacing therebetween includes generating an input frequency comb comprising a multiplicity of input frequency comb lines with a light source. Individual frequency comb lines having an identical frequency spacing are filtered out of the multiplicity of input frequency comb lines so as to obtain filtered frequency comb lines. A first modulating of the filtered frequency comb lines is performed at a first modulation frequency so as to generate first sideband lines. The first sideband lines are generated by the first modulating so that the filtered frequency comb lines and the first sideband lines have an identical frequency spacing.

12 Claims, 5 Drawing Sheets

GENERATION OF FREQUENCY COMBS AND SINC-SHAPED NYQUIST PULSE TRAINS WITH A LARGE BANDWIDTH AND TUNABLE REPETITION RATE

CROSS REFERENCE TO PRIOR APPLICATIONS

Priority is claimed to European Patent Application No. EP 14155209.1, filed Feb. 14, 2014. The entire disclosure of said application is incorporated by reference herein.

FIELD

The present invention relates to a method and to a device for generating an optical frequency comb, in particular with any bandwidth and any spacing between the frequency lines, and for generating sinc-shaped Nyquist pulse trains with any bandwidth and repetition rate.

BACKGROUND

Theodor W. Hänsch and John L. Hall were awarded the Nobel Prize in Physics in 2005 for precision spectroscopy on the basis of highly precise optical frequency combs. Using such frequency combs, it is possible not only to measure fundamental constants with a high accuracy, but it is also possible to determine the difference between matter and antimatter. Such frequency combs are moreover very important in technical applications. By way of example, data transmission in optical fibers by means of "wavelength division multiplexing" (WDM) is based upon a frequency comb. Many other technical applications, such as radio-over-fiber systems, microwave photonics, and quasi-light-storage, also require precise, tunable frequency combs.

The following applies to such frequency combs: if all frequencies of the frequency comb have a fixed phase relation to one another, the time representation of the comb is a pulse train. If, moreover, all frequencies have the same amplitude and the same or a linearly displaced phase and if simultaneously unwanted frequency components are strongly damped, the time representation of this quasi-rectangular frequency comb is a cardinal sine (sinc) pulse train, where the following applies: $sinc(x)=sin(x)/x$. The sinc function is the Fourier transform of the rectangular function.

Sinc pulses are of particular importance in order to be able to increase the bit rates in future communication networks because sinc pulses enable information transmission with a maximum symbol rate. Whereas pure sinc pulses are non-causal and therefore not realizable, it is possible, by contrast, to realize a sinc pulse train by means of a frequency comb. For communication purposes, this pulse train has the same advantages as the individual pulses. Since the pulses of the sinc pulse train satisfy the Nyquist ISI criterion, these are also referred to as Nyquist pulses.

"Optical sinc-shaped Nyquist pulses of exceptional quality" by Marcelo A. Soto, Mehdi Alem, Mohammad Amin Shoaie, Armand Vedadi, Camille-Sophie Brés, Luc Thévenaz and Thomas Schneider describes a possibility for producing Nyquist pulse trains. A frequency comb with nine lines is generated in one embodiment by means of a laser by virtue of the individual line taken from the laser being provided with two side-lines by modulation, wherein these three lines are in turn respectively equipped with two side-lines by a second modulation cascade. All lines generated thus have the same spacing. In order to generate the necessary approximately equal phase between the lines, however, the phase difference between the modulated radiofrequency signals must be set precisely to compensate for propagation time differences. The bandwidth is also restricted to a relatively small bandwidth of approximately 160 GHz as a result of the modulators.

It is now known that mode-locked lasers generate a frequency comb. Such a frequency comb does not, however, have a rectangular form and the spacing between the individual frequency lines is fixedly predetermined by the repetition rate of the laser. This makes these frequency combs unsuitable for many applications. Another option consists of coupling phase modulators to one another, or to intensity modulators, and to thereby generate a frequency comb. Phase modulators cannot, however, be used to generate rectangular frequency combs. The maximum bandwidth obtainable by these frequency combs is also restricted by the bandwidth of the employed modulators.

It was until now only possible to generate approximately ideal sinc pulses with a maximum bandwidth of approximately 160 GHz (see above), corresponding to a temporal full width at half maximum (FWHM) duration of the pulses of approximately 6 ps. The maximum number of the lines of a frequency comb is also restricted, with the number of lines defining the repetition rate of the sinc pulses. However, for specific applications, such as, for example, for generating arbitrary pulse shapes, a number of lines which is as high as possible and a short duration of the pulses is desired.

SUMMARY

An aspect of the present invention is to provide an improved method and an improved device for producing frequency combs and pulse trains, in particular sinc pulse trains, with any adjustable repetition rate and high bandwidth, which can be realized by a technically simple means and which can accordingly be used for communication purposes.

In an embodiment, the present invention provides a method for generating an optical frequency comb with a defined number of frequency comb lines with an adjustable spacing therebetween which includes generating an input frequency comb comprising a multiplicity of input frequency comb lines with a light source. Individual frequency comb lines having an identical frequency spacing are filtered out of the multiplicity of input frequency comb lines so as to obtain filtered frequency comb lines. A first modulating of the filtered frequency comb lines is performed at a first modulation frequency so as to generate first sideband lines. The first sideband lines are generated by the first modulating so that the filtered frequency comb lines and the first sideband lines have an identical frequency spacing.

BRIEF DESCRIPTION OF THE DRAWINGS

The present invention is described in greater detail below on the basis of embodiments and of the drawings in which.

DETAILED DESCRIPTION

The basic concept of the present invention comprises extracting individual lines with an equidistant spacing from a light source, in particular from a mode-locked laser, which lines then serve as input lines for one or more cascaded modulators. Nine sidebands are once again generated by the modulation, wherein the number of extracted lines, and therefore the width of the comb, is freely selectable. The frequency spacing is modifiable by the modulation. Care must be taken, however, that the frequency spacing between the lines is set to be the same over the modulation. In this respect, the selectable frequency spacing also depends on the spacing of the initially extracted lines. The bandwidth of the frequency comb generated according to the present invention is therefore predetermined by the bandwidth of the first frequency comb, which is generated by the mode-locked laser, and which may lie in the THz-range. At the same time, filtering enables a matching of the amplitudes of the individual frequencies.

It can be advantageous to synchronize the repetition rate of the light source and the modulation frequencies in the phases thereof to one another for the purposes of generating the pulse trains, in particular sin(x)/x-shaped pulse trains.

The procedure according to the present invention goes beyond pure optical filtering of a first frequency comb for generating a second frequency comb with arbitrary bandwidth. Frequency combs thus generated would not be rectangular since optical filters do not have a rectangular bandwidth. It would therefore not be possible, in particular, to generate sin(x)/x pulse trains. The spacing between the frequencies of the comb would also be fixedly determined by the repetition rate of the laser, which can only be modified to a small extent. By contrast, using the present invention, it is possible to set the frequency spacing by the outer modulation frequency and any spacing from a specific frequency, which is at 4 GHz in the subsequent example, may be set.

An advantage of the procedure according to the present invention therefore lies in the fact that sinc pulse trains with any bandwidth and any repetition rate can, in principle, be produced. It is at the same time possible to produce rectangular combs with any number of frequency lines and any spacing between the individual frequencies. If the phases of the electric actuation signals are set in a controlled manner, the time representation of such a comb is an ideal sinc-shaped pulse train.

The present invention will be explained in more detail below on the basis of the Figures.

Figure 1:
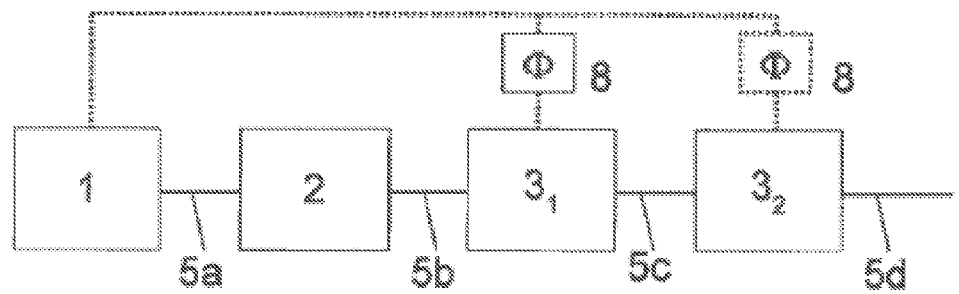
FIG. 1 schematically shows the setup of an arrangement for generating a rectangular optical frequency comb.

The basic principle for generating a rectangular optical frequency comb with any bandwidth, line number and frequency spacing is shown in FIG. 1. The device presented schematically therein comprises a light source 1, an optical filter 2 adjoining the light source 1 and downstream optical modulators $3_1$, $3_2$. Any system with which an optical frequency comb 5 can be generated can serve as light source 1, with a mode-locked laser (MLL) being particularly suitable therefor. The optical modulators $3_1$, $3_2$ can be set by means of the frequency generators $f_1$, $f_2$ (not shown in the Figures) and an additional BIAS voltage applied to the modulators so that all lines have approximately the same amplitude and phase. It is also possible to suppress higher-order sidebands.

The light source 1 is synchronized (dashed line) with the phases of the frequency generators $f_1$, $f_2$ by means of phase shifters 8 to the extent that the repetition rate of the light source and the modulation frequencies are synchronous to one another in terms of the phases thereof. In place of a plurality of optical modulators $3_1$, $3_2$ and frequency generators $f_1$, $f_2$, use can also be made of a single optical modulator and frequency generator which is operated at a plurality of RF-frequencies. It is material to the pulse generation according to the present invention, however, that the synchronization between the phases of the original comb and the phases of the RF generator or generators is provided.

The method for generating an optical frequency comb 5 (5c, 5d) with a defined number of frequency comb lines ($4_1$, $4_3$, $4_4$) comprises the following method steps:

The input frequency comb 5a generated by the light source 1 initially comprises a multiplicity of input frequency comb lines $4_1$, $4_2$. The frequency comb 5 can in particular be generated with the aid of a mode-locked laser (MLL) or a comb generator. The reference sign $4_1$ denotes the frequency comb lines to be selected or the filtered frequency comb lines; the reference sign $4_2$ denotes the frequency comb lines that are not selected.

The input frequency comb 5a generated by the light source 1, which is not yet rectangular, is shown in FIG. 2a). The individual input frequency comb lines $4_1$, $4_2$ of the input frequency comb 5a have amplitudes with different heights and are therefore characterized by different lengths. The frequency difference $\Delta f_L$ between the individual, still unfiltered input frequency comb lines $4_1$, $4_2$ of the input frequency comb 5a, is modifiable to a small extent by changing the repetition rate of the laser 1.

Individual frequency comb lines, namely those provided with reference sign $4_1$, are filtered with the aid of the optical filter 2 from the input frequency comb 5a generated by the laser 1, which lines respectively have an identical spacing of $\Delta f_i = (n_k+1)^*\Delta f_L$ (FIG. 2b)), where $n_k$ is a natural number (0, 1, 2, 3, ...) and corresponds to the number of frequency comb lines $4_2$ that are not filtered out between the respective two filtered-out input frequency comb lines $4_1$. In the present case, $n_k=1$, and so the following applies: $\Delta f_i = 2\Delta f_L$. Any form of optical filter able to select individual frequency comb lines $4_1$ from the input frequency comb 5a can serve as an optical filter 2. This means that the filter bandwidth $\Delta f_F$ of the optical filter 2 must be less than the frequency difference between the individual frequency comb lines 4 of the original frequency comb 5, and so the following applies: $\Delta f_F < \Delta f_L$.

Most optical filters 2 have filter bandwidths of $\Delta f_F > 10$ GHz. Input frequency combs 5a with the smallest possible spacing $\Delta f_L$, are, however, preferably generated. A femtosecond (fs) fiber laser, for example, generates frequency combs 5 with a frequency comb line spacing $\Delta f_L$, of between 80 MHz and 100 MHz. Frequency comb lines from such a source can therefore, for example, be extracted with the aid of polarization-pulling assisted stimulated Brillouin scattering (PPA-SBS) as an optical filter 2, since a PPA-SBS can have filter bandwidths of $\Delta f_F = 3$ MHz or less.

The input frequency comb lines $4_1$ to be selected are extracted by setting the optical filter 2 (in particular by setting the strength of the corresponding pump in the case of filtering by means of PPA-SBS) so that they all have the same power. This is visualized in FIG. 2b) by selected input frequency comb lines $4_1$ having an identical length.

The selected input frequency comb lines $4_1$ are modulated by the first optical modulator $3_1$ with a frequency $\Delta f_1$. Intensity modulators or phase modulators can, for example, be used as optical modulators 3. Mach-Zehnder intensity modulators are in particular advantageous for generating Nyquist pulses since these are able to generate two lines with the same amplitude and the same phase and effectively suppress higher-order frequency lines by an appropriate setting of the power of the modulation signal (RF power) and the bias voltage.

FIG. 2c) shows a first modulated frequency comb $5c$ after passing through the first Mach-Zehnder modulator $3_1$. Two sidebands $4_3$ as first modulated frequency comb lines with a frequency spacing of $\Delta f_1 = \frac{1}{3}\Delta f_i$ are generated around each frequency comb line $4_1$ extracted from the optical source 1 by this modulation. The second modulator $3_2$ can be an intensity modulator or phase modulator. If the second modulated frequency comb $5d$ generated is, however, thus intended to be used for generating Nyquist pulse trains, use can advantageously be made of an MZM. The latter is operated at a frequency of $\Delta f_2 = \frac{1}{3}\Delta f_1 = \frac{1}{9}\Delta f_i$ and generates two new (second modulated) frequency comb lines $4_4$ around each optical frequency comb line $4_1$, $4_3$ (applied to the second modulator $3_2$). The result is a flat, almost ideal rectangular frequency comb $5d$ with $l = n_1 * 3^n$ lines 4. Here $n_1$ is the number of frequencies $4_1$ originally extracted from the source 1 and n is the number of modulators.

Sideband lines are thus generated by modulating the filtered frequency comb lines ($4_1$), wherein the sideband lines ($4_3$, $4_4$) are set by the modulation so that all lines ($4_1$, $4_3$, $4_4$) have an identical frequency spacing ($\Delta f_2$) to one another. The thicker line strength of the frequency comb lines $4_1$, $4_3$ in relation to the frequency comb lines $4_2$, $4_4$ in FIG. 2 only serves for improved visual differentiation between the corresponding frequency comb lines and has no technical meaning.

In the present exemplary embodiment, $n_1 = 3$ and $n = 2$, so that the number of frequency comb lines is $l = 27$. If use is made of more than two modulators, the number 1 of frequency comb lines 4 in the modulated frequency comb 5 increases exponentially. By contrast, if more original frequencies $4_1$ are extracted by the optical filter 2, the number 1 of frequency comb lines 4 in the frequency comb 5 increases linearly. In place of two optical modulators 3 (as shown in FIG. 1), it is also possible to use a single optical modulator which is driven by a plurality of modulation frequencies. It is also possible to excite higher-order sidebands.

If only two first-order sidebands are excited, the modulated frequency comb $5c$, $5d$ has a bandwidth of $B = (1-1)*A1$; $3^{n}*\Delta f_i$. The latter can be modified by 1, n and $\Delta F_i$. The frequency spacing between the individual frequency comb lines in the modulated frequency comb is $\Delta f = \frac{1}{3}^n * \Delta f_i$. Consequently, in FIG. 2d) (with n=2), $\Delta f = \Delta f_2 = \frac{1}{9} \times \Delta f_i$. The frequency spacing between the frequencies in the comb can accordingly be controlled by n and $\Delta f_i$. It is relatively complicated to increase the number of modulators n, while $\Delta f_i$ corresponds to a multiple of the repetition rate in the case of an MLL. In most MLLs, said repetition rate can be changed by +/-1%. The frequency difference can accordingly be modified in steps of $\Delta f_i = \Delta f_L + -(n_k+1)*0.01*\Delta f_L$.

In the case of an fs fiber laser with $\Delta f_L = 80$ MHz, this means that, if 40 lines lie between the two extracted ones (in FIG. 2a), this would mean that there are at least 40 frequency comb lines $4_2$ not to be selected between two input frequency comb lines $4_1$ to be extracted), the extracted line can be modified so greatly in terms of the frequency thereof that it corresponds to the frequency of the preceding or next line.

A modulated frequency comb with any bandwidth, number of lines, and frequency spacing between the lines can accordingly be generated by means of an fs fiber laser if $\Delta f_i > 4$ GHz.

Figure 3:
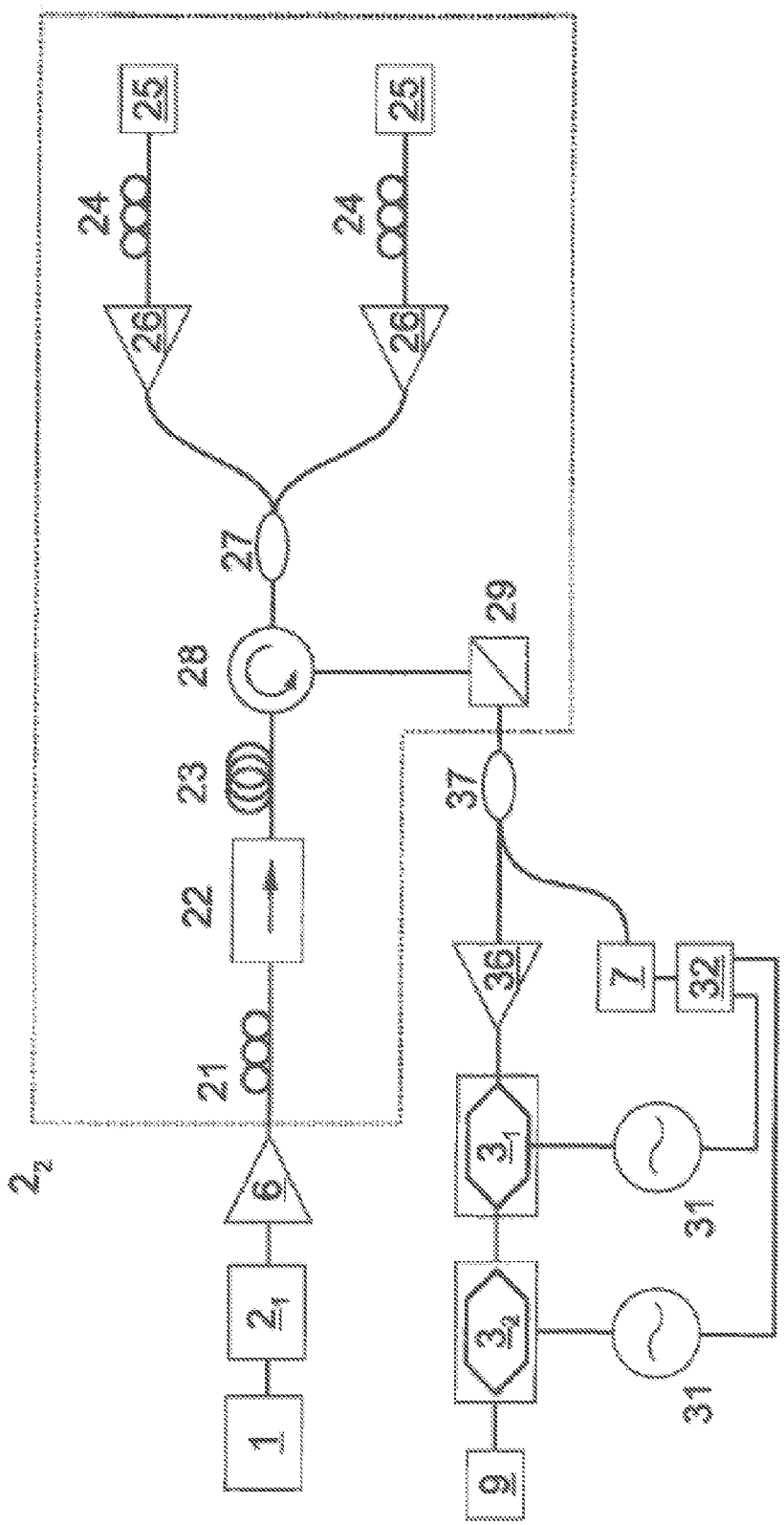
FIG. 3 schematically shows an alternative arrangement for generating a rectangular optical frequency comb.

A possible arrangement for carrying out the present invention is shown in FIG. 3. An fs fiber laser 1 with a repetition rate of $\Delta f_L = 80$ MHz here serves as a light source 1. In order to improve the signal-to-noise ratio after a preamplifier 6, a pre-filter $2_1$ is used to only let pass some of the entire spectrum generated by the laser. The PPA-SBS serves as a further filter $2_2$ in the embodiment according to FIG. 3. The SBS is an amplification process in which a pump wave, which propagates in a direction of an SBS medium 23, generates a narrowband gain for a counter-propagating signal wave shifted downward in terms of frequency. The frequency shift between pump wave and signal wave is typically 11 GHz and the gain bandwidth is 10-30 MHz for pump waves of 1550 nm and standard single mode optical fibers (SSMF). This bandwidth can be reduced to 3 MHz. An SSMF 23 serves as an SBS medium. Two or more pump waves are generated by laser diodes 25, amplified by respective amplifiers 26 and fed into the SSMF 23 via an N:1 coupler 27 (where N corresponds to the number of connected laser diodes) and a circulator 28. The wavelength of the two laser diodes 25 is set so that it amplifies two frequency comb lines from the frequency comb 5 of the laser 1. This wavelength can be locked to the comb lines to be amplified by various electronic processes.

The polarization pulling effect from the SBS means that the pump wave rotates the polarization of the signal wave in the direction of its own polarization. The polarization of the comb generated by the optical source 1 is accordingly set by means of a polarization shifter 21, which is followed by an isolator 22, so that it is perpendicular to a polarization filter 29. No comb component can thus pass this filter without SBS. The polarization of the pump waves is set by polarization shifters 24 respectively assigned to the pump waves so that it is parallel to the PBS. Two or more frequency comb lines of the frequency comb are thus amplified by the SBS and the polarization direction of said comb lines is rotated parallel to the PBS. Only the frequency comb lines amplified by the SBS can therefore pass the PBS.

Figure 2:
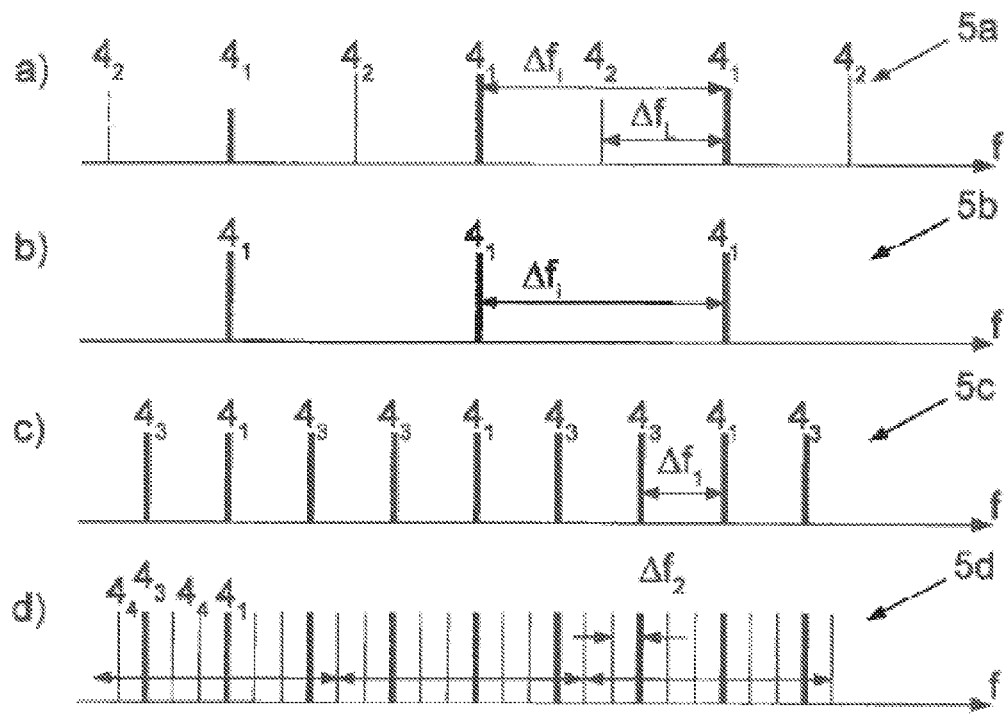
FIG. 2 shows the frequency spectra in different stages of the method: a) after generating the light by a source, b) after filtering, c) after a first modulation, and d) after a second modulation.

The extracted input frequency comb lines $4_1$ are amplified via an amplifier 36 and are then, as described in FIGS. 1 and 2, modulated by the two optical modulators $3_1$, $3_2$. The frequency between the extracted lines $\Delta f_i$ is measured with the aid of a photodiode 7 since the repetition rate of the laser can change or may be changed. To this end, a portion of the extracted frequency comb lines $4_1$ is split off by means of a splitter 37 in the direction of the photodiode 7. The control frequencies, by means of which the two optical modulators $3_1$, $3_2$ are actuated, are generated by two RF generators 31. The control frequencies emerge from $\frac{1}{3}*\Delta f_i$ and $\frac{1}{9}*\Delta f_i$ and are calculated with the aid of a computer 32. In the present exemplary embodiment, the optical spectrum analyzer 9 serves to display the results. The pulses would be decoupled for further use at this position.

Figure 4:
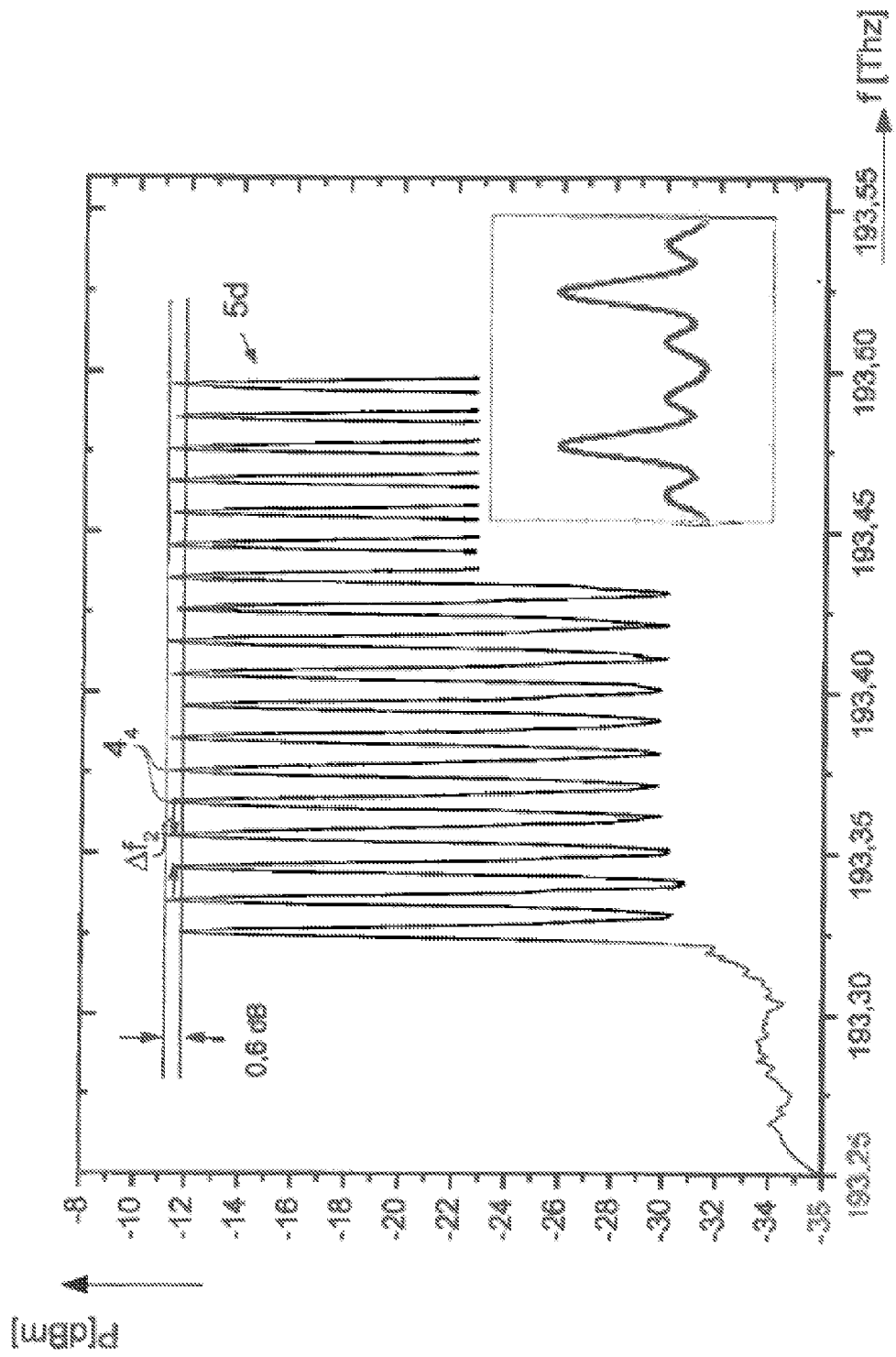
FIG. 4 shows a frequency spectrum of the second modulated frequency comb.
Figure 5:
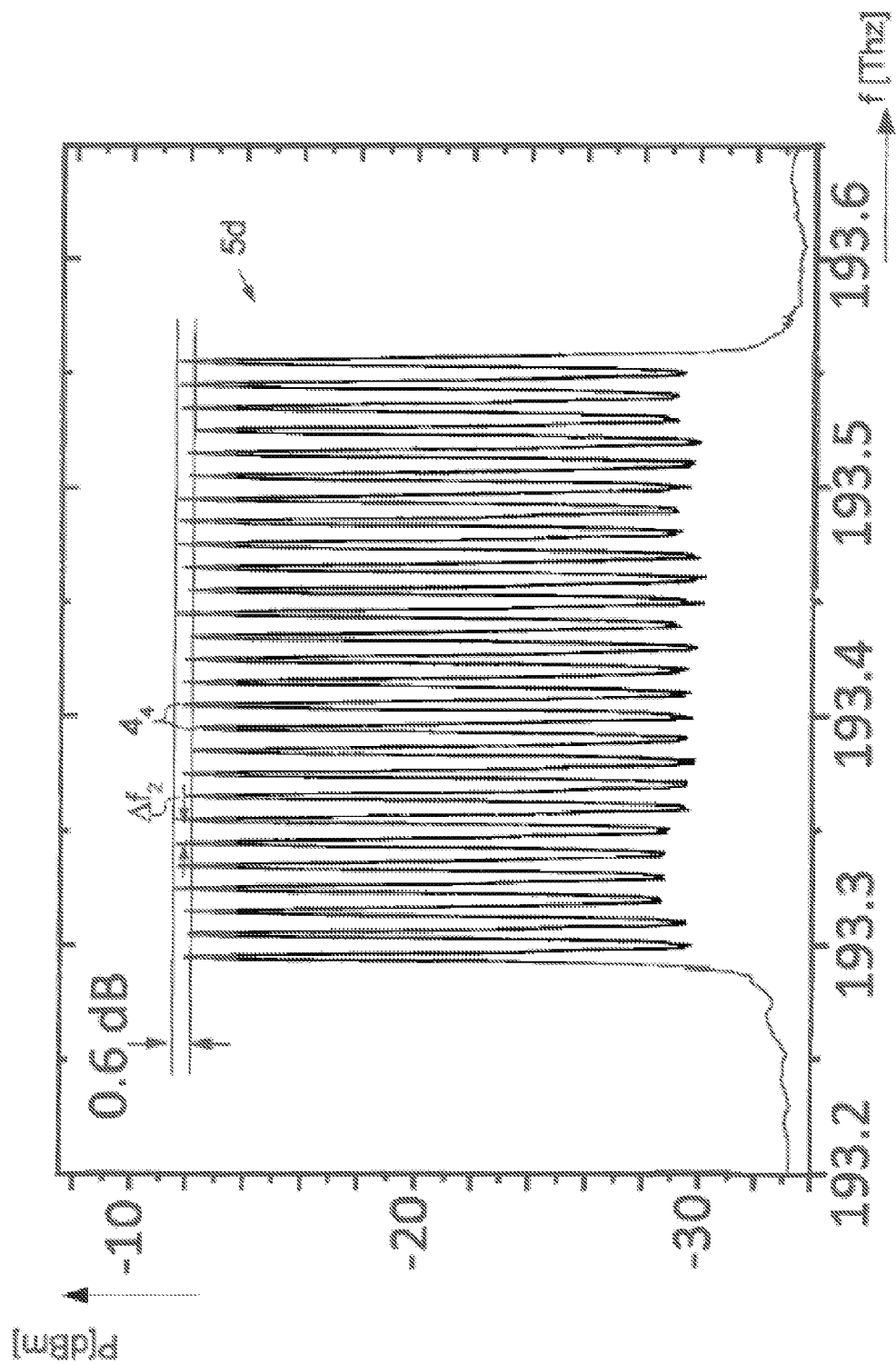
FIG. 5 shows a further frequency spectrum of the second modulated frequency comb.

FIGS. 4 and 5 show results of the aforementioned method. What is shown in FIG. 4 is a modulated second frequency comb with 18 frequency comb lines $4_4$, a frequency spacing $\Delta f_2$ between the frequency comb lines $4_4$ of 10 GHz and, as a result thereof, an overall bandwidth of 170 GHz. The inset shows the associated light pulse in the time domain. Since pulses can be seen in the time domain, the individual frequency components of the comb are locked to one another in phase. FIG. 5 shows a further second modulated frequency comb $5d$ with 27 modulated frequency comb lines $4_4$, a frequency spacing $\Delta f_2$ between the lines $\Delta f_2$ of 10 GHz, and an overall bandwidth of 260 GHz.

If the phases of the RF generators 31, which actuate the optical modulators 3, are synchronized to one another and to the light source 1, as indicated by the dashed line in FIG. 1, and if the phase difference between said RF generators 31 is set with the aid of a phase shifter 8, then a rectangular frequency comb in the time domain represents a sinc pulse train.

Figure 6:
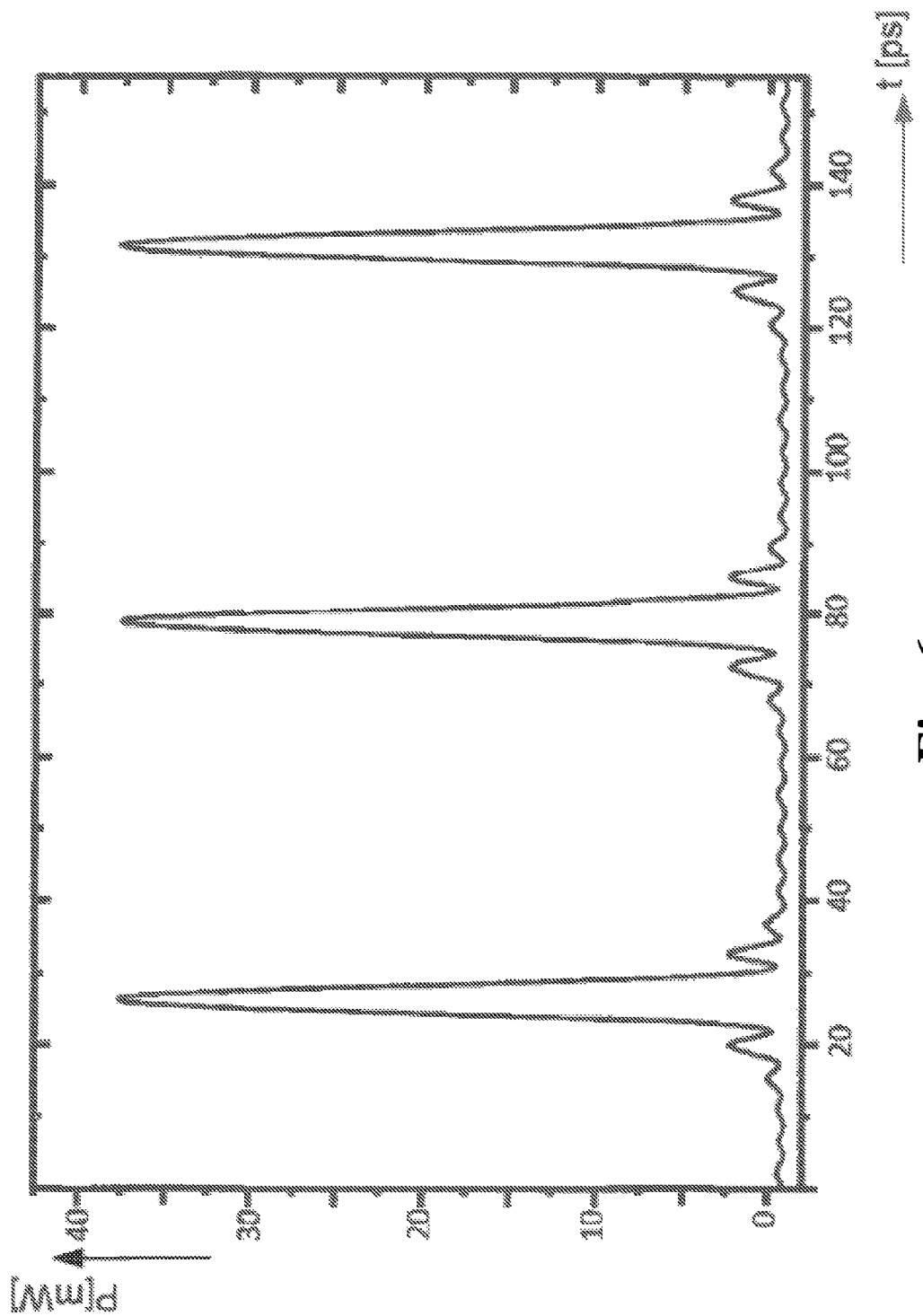
FIG. 6 shows a sinc pulse train comprising a second modulated frequency comb.

FIG. 6 shows such a sinc pulse train for 12 comb lines with a frequency spacing of 19.04 GHz to one another in the time domain. Although possible, the setup according to FIG. 3 was not here used; rather, a comb generator was used as a soeurce and the lines upstream of the modulators were filtered out by means of an optical filter, as shown in FIG. 1.

The present invention is not limited to embodiments described herein; reference should be had to the appended claims.

LIST OF REFERENCE NUMERALS

1 Light source
2 Optical filter
$2_1$ Pre-filter
$2_2$ Further filter
3 Optical modulator
$4_1$ Selected input frequency comb line
$4_2$ Not selected input frequency comb line
$4_3$ First modulated frequency comb line
$4_4$ Second modulated frequency comb line
5a Input frequency comb
5b Selected frequency comb
5c First modulated frequency comb
5d Second modulated frequency comb
6 Preamplifier
7 Photodiode
8 Phase shifter
9 Optical spectrum analyzer
21 Polarization shifter
22 Isolator
23 Optical medium
24 Polarization shifter
25 Laser diodes
26 Amplifier
27 Coupler
28 Circulator
29 Polarization filter
31 RF generator
32 Computer
36 Amplifier
37 Splitter
$\Delta f_L$ Spacing of the input frequency comb lines
$\Delta F_i$ Spacing of the selected input frequency comb lines
$\Delta f_1$ Spacing of the frequency comb lines of the first modulated frequency comb
$\Delta f_2$ Spacing of the frequency comb lines of the second modulated frequency comb
l Number of the frequency comb lines of the first modulated frequency comb
$n_k$ Number of the not selected input frequency comb lines between two adjacent selected input frequency comb lines
n Number of modulators connected in series

What is claimed is:

1. A method for generating an optical frequency comb with a defined number of frequency comb lines with an adjustable spacing therebetween, the method comprising:
generating an input frequency comb comprising a multiplicity of input frequency comb lines with a light source;
filtering out of the multiplicity of input frequency comb lines the individual frequency comb lines having an identical frequency spacing so as to obtain filtered frequency comb lines; and
preforming a first modulating of the filtered frequency comb lines at a first modulation frequency so as to generate first sideband lines,
wherein the first sideband lines are generated by the first modulating so that the filtered frequency comb lines and the first sideband lines have an identical frequency spacing.

2. The method as recited in claim 1, wherein the light source (1) is a mode-locked laser (MLL).

3. The method as recited in claim 2, wherein,
the input frequency comb comprises a frequency spacing, and
the mode-locked laser comprises a repetition rate, and
further comprising, modifying the input frequency spacing of the input frequency comb by varying the repetition rate of the mode-locked laser (MLL).

4. The method as recited in claim 1, wherein the first modulating of the filtered frequency comb lines is performed with a plurality of frequencies having a same spacing so as to generate a plurality of first sideband lines.

5. The method as recited in claim 1,
further comprising, performing a second modulating of the first sideband lines at a second modulating frequency so as to generate second sideband lines,
wherein the second sideband lines are generated by the second modulating so that the filtered frequency comb lines and the second sideband lines have an identical frequency spacing.

6. The method as recited in claim 5, wherein the first sideband lines and/or the second sideband lines are generated so as to have a substantially identical amplitude.

7. The method as recited in claim 5, wherein,
the light source comprises a light source repetition rate, and
further comprising synchronizing phases of the light source repetition rate and phases of the first modulating frequency and/or the second modulating frequency to each other so as to generate pulse trains.

8. The method as recited in claim 7, wherein the pulse trains have a sin(x)/x-shape.

9. The method as recited in claim 1, wherein the filtering out of the multiplicity of input frequency comb lines the individual frequency comb lines having an identical frequency spacing so as to obtain the filtered frequency comb lines is performed by a polarization-pulling assisted stimulated Brillouin scattering (PPA-SBS).

10. A device for performing the method as recited in claim 1, the device comprising:
a light source comprising a repetition rate;
an optical filter arranged downstream of the light source;
a frequency generator configured to provide modulation frequencies;
at least one optical modulator configured to be actuated by the frequency generator; and
a phase synchronization device configured to synchronize the repetition rate of the light source and the modulation frequencies of the frequency generator.

11. The device as recited in claim 10, wherein the light source is a mode-locked laser (MLL).

12. The device as recited in claim 10, wherein the optical filter performs based on a polarization-pulling assisted stimulated Brillouin scattering (PPA-SBS) principle.

* * * * *